March 5, 1940.  R. A. BRADLEY ET AL  2,192,593
TRAILER TANK
Filed Aug. 13, 1938    2 Sheets-Sheet 1
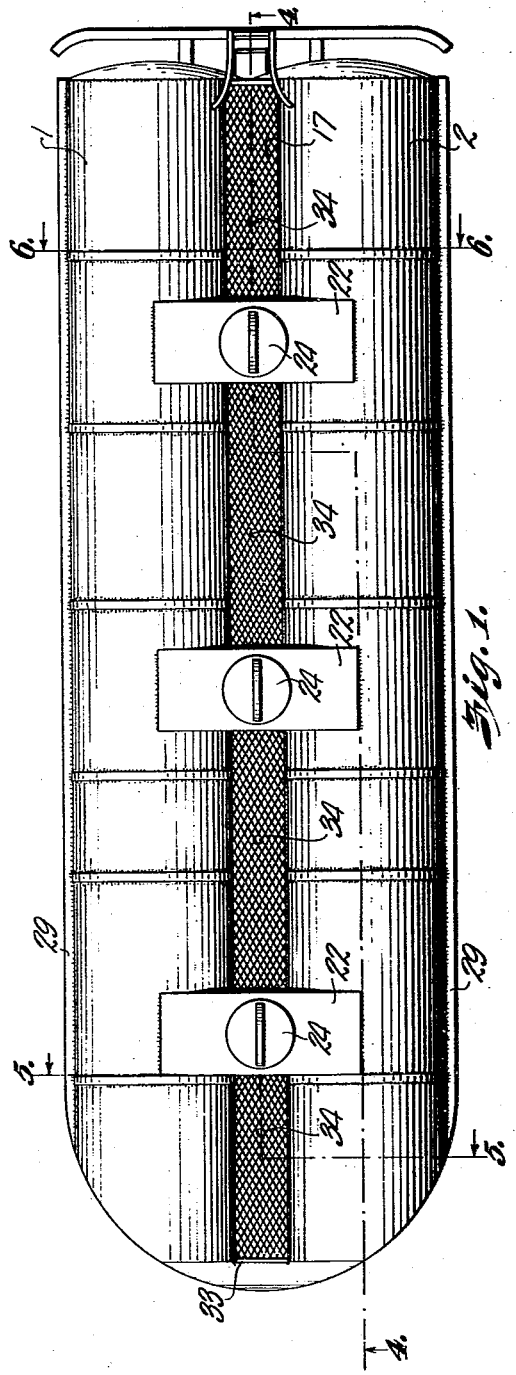
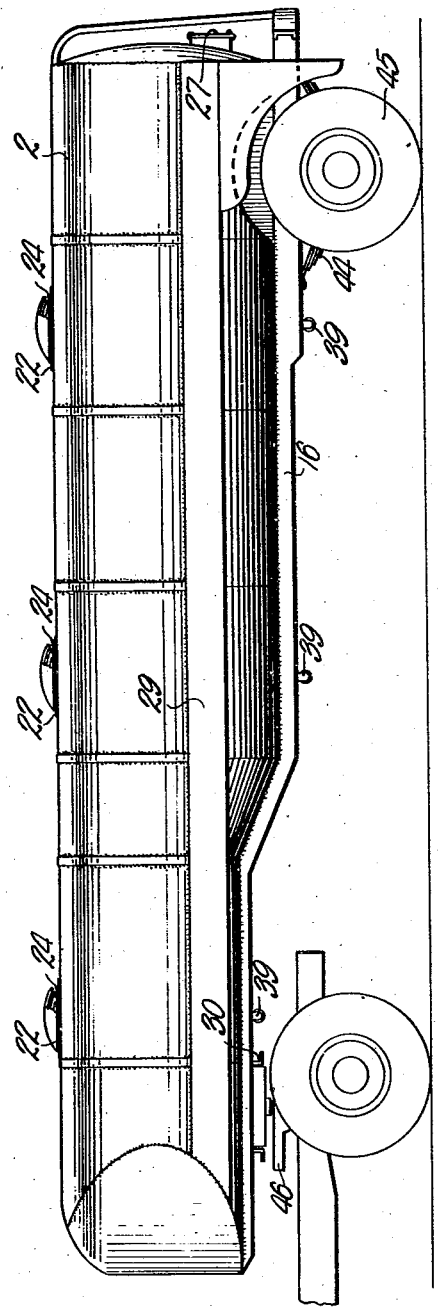
INVENTORS
Ralph A. Bradley
Ralph D. George
BY
ATTORNEY

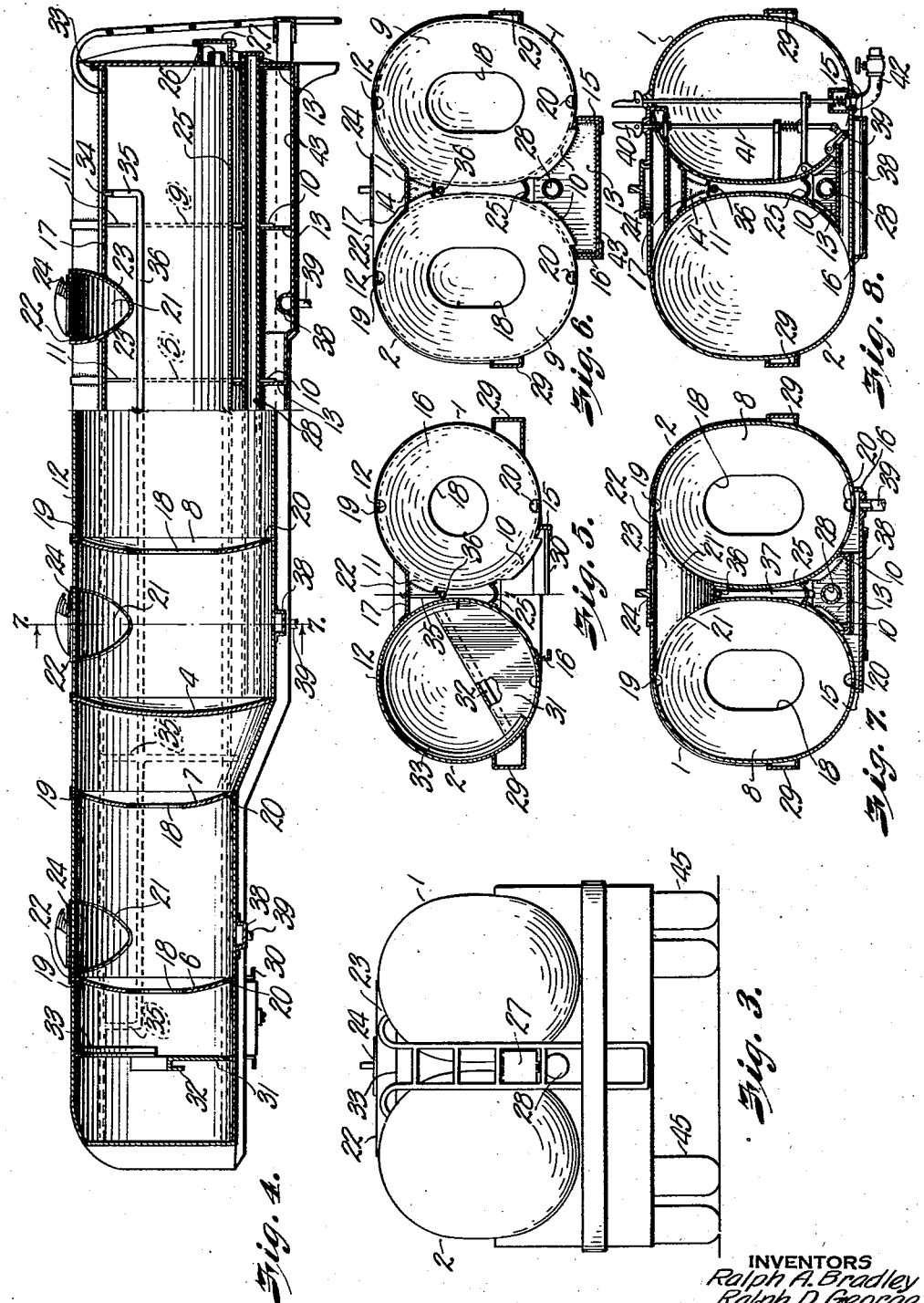

/ Patented Mar. 5, 1940

2,192,593

UNITED STATES PATENT OFFICE 2,192,593

TRAILER TANK

Ralph A. Bradley and Ralph D. George, Kansas City, Mo., assignors to Butler Manufacturing Company, Kansas City, Mo., a corporation of Missouri Application August 13, 1938, Serial No. 224,742

10 Claims. (Cl. 280—5)

Our invention relates to trailer tanks and more particularly to an improved construction in which the customary trailer frame may be dispensed with.

Currently, the increase in the number of automotive vehicles has made the distribution and transportation of motor fuels an important problem. Railroads and pipe lines employed principally for the transportation of motor fuel must by necessity travel between principal cities. There is a vast area in which there exists a demand for gasoline and fuel oils, to which these commodities must be transported by independent vehicles. The increase in the number of tank wagons and trailer tanks for the transportation of gasoline and the like has caused most States to pass laws limiting the size and weight of these vehicles. It has become a factor of prime economical importance to obtain as large a pay load as possible for a given dead weight of transporting vehicle. The trailer lends itself to the hauling of greater loads for a given motor unit.

It has been customary to support trailer tanks upon trailer frames or trailer chassis, the function of which has been to carry the load. This represents a distinct loss in pay load since the weight of the trailer frame and associated parts must be deducted from the total weight of the unit as determined by the various state laws. In order to obtain rigidity, it has been suggested to weld or otherwise secure the trailer frame to the tank itself. It has also been suggested to incorporate reinforcing members in the tank construction to constitute a truss and thus render it a self supporting beam. In the construction of the latter named type, the stresses and the resulting deflection are not of the same range as the reinforcing structure and the tanks do not deflect together under a working load. This causes strains and eventually results in crystallization and fracture with ensuing leaks and failures.

In designing a frameless transport tank, there are four vital factors to consider, namely, the section modulus, the vertical shear, the distribution of the reactionary forces, and the bottom section of the tank. Considering a tank as a beam supported by the king pin and the trailing axle, if we calculate the section modulus of the tank shell and the bending moments imposed on the shell, we will find that the present tank constructions have a factor of safety varying from 20 to 30. This factor of safety is more than ample and in practice there has been no known case of a tank failure due to the use of a section modulus too small for the load imposed on it. The effective vertical shear area employed by the tank constructions of the prior art has been sufficient to reduce the total shear imposed on the tank shell to a unit shear of approximately one thousand pounds per square inch. Although no definite figure for a safe unit shear can be set for the curved sheet such as used in a tank shell, it is apparent that a thousand pounds per square inch is ample for a section spanning a "reasonable distance." This "reasonable distance" for a span depends, of course, on the shape of the shell section, the thickness of the shell material, the particular shell material employed, and the method and amount of stiffening between supports. As presently employed in the prior art, there has been no known case of tank failure due to overstressing in vertical shear.

The simplest and surest way of properly distributing the reactionary forces into the tank shell is through the heads, bulkheads, false bulkheads, or a combination thereof. There have been a number of tank failures in the prior art due to an over concentration of stresses and due to the fact that the deflections resulting from the stresses in the reinforcing structure and the deflection in the tank shell are neither of the same range nor in the same direction.

The bottom section of a tank is subjected to varying forces and stresses due to the shock load of the liquid contents of the tank as the tank travels over rough roads. The nature of the load imposed and the shape of the bottom of the tank present the most difficulty and the most vital design problem in the building of a transport tank. Tank failures which have been examined clearly show that the greater percentage of failures are due to the constructions in the bottoms of the tanks. A long bottom radius makes a weaker bottom section than a short bottom radius.

Our study of the above facts has indicated to us that the section modulus of a tank can be reduced without affecting the strength of the tank as a whole; that the effective shear area of the shell should not be reduced materially without adding bracing of some kind or shortening the span; and that a bottom section of a small radius is desirable.

One object of our invention is to provide a trailer tank which is of sufficient strength so that the tank itself may constitute a beam able to support the load.

Another object of our invention is to provide a trailer tank construction of lighter weight than known tank constructions but being, nevertheless, a stronger and safer tank.

Other and further objects of our invention will appear from the following description.

In general, our invention contemplates the employment of a pair of cylindrical tanks assembled and interconnected in such a manner as to comprise a unitary structure. This construction will enable us to use shorter bottom radii than have heretofore been possible. Our construction, furthermore, will enable us to use shell material of lighter gauge, that is, thinner shell walls than have heretofore been used, without sacrificing tank strength. Although in our construction the section modulus will be somewhat decreased, the effective shear area is twice that of an elliptical tank of similar capacity.

In the accompanying drawings which form part of the instant specification and are to be read in conjunction therewith and in which like reference numerals are used to indicate like parts in the various views:

Figure 1 is a top plan view of a trailer tank construction according to one embodiment of our invention.

Figure 2 is a side elevation of the trailer tank shown in Figure 1 including a portion of a towing vehicle.

Figure 3 is a rear end view of the trailer tank shown in Figures 1 and 2.

Figure 4 is a sectional view taken on a line 4—4 of Figure 1.

Figure 5 is a sectional view taken on a line 5—5 of Figure 1.

Figure 6 is a sectional view taken on a line 6—6 of Figure 1.

Figure 7 is a sectional view taken on a line 7—7 of Figure 4.

Figure 8 is a sectional view similar to that shown in Figure 7, of a modified embodiment of our invention.

Referring now to the drawings, we employ a pair of separate tanks each of which is of cylindrical cross section. These cylindrical tanks are indicated by reference numerals 1 and 2 respectively. The tanks are provided with a plurality of bulkheads 4 and 5, and a plurality of false bulkheads 6, 7, 8, and 9. Each of the bulkheads and false bulkheads is formed with lower fins 10 and upper fins 11 which project through the tank shells proper 12 as can readily be seen by reference to Figures 5, 6, and 7. The construction in each of the two tanks 1 and 2 is identical so that there are formed a plurality of pairs of lower fins 10 and upper fins 11 projecting through the tank shells toward each other. Each of the pairs of lower fins 10 are welded to respective tie plates 13. Each of the pairs of upper fins 11 are welded to respective tie plates 14. This can be readily seen by reference to Figure 6. All of the lower tie plates 13 are secured by welding or in any other suitable manner to external longitudinally extending structural members such as angles 15 and 16. The upper tie plates 14 are welded to a runway 17 as can readily be seen by reference to Figures 5 and 6. The runway 17 being depressed between the tanks prevents spilling of gasoline, oil or other liquid over the sides of the tank. In the case of gasoline and oil, this reduces fire hazard and, in any event, keeps the tank sides free of liquid which would otherwise collect dust.

Each of the false bulkheads 6, 7, 8 and 9 is provided with a central opening 18 and a small upper opening 19 as well as a small lower opening 20. The upper openings 19 allow equalization of the vapor within a compartment formed by a bulkhead and an end wall, and the lower openings 20 allow equalization fore and aft of liquid in a compartment below the aperture 18. Each compartment is formed with a side opening 21. Respective pairs of side openings are enclosed by respective common housings each formed by a top plate member 22 and side wall members 23. The runway 17 is interrupted by the filling housings as can readily be seen by reference to Figure 4. Each of the filling housings is provided with a manhole equipped with a manhole cover 24. The intertank space formed by the runway portions and the side walls of the tanks is closed at the bottom by a closure member 25 so that, if desired, the intertank space may be tested pneumatically or hydraulically for tightness. In order to facilitate this testing, we provide a threaded nipple 26 leading to the intertank space. Access to the nipple is had by opening door 27. A test connection can be secured to the nipple 26 for test purposes. If desired, the intertank space may be used as a hose carrier, the hose being inserted through the nipple 26. A tube 28 is carried by the lower tie plates 13. The tube is adapted to act as a hose carrier. The placing of the hose tubes between the tanks increases the allowable road width which may be utilized for the tanks proper. Channel members 29 are welded to the tank sides to act as rub rails. The bolster 30 for the fifth wheel is secured to the exterior of the forward portion of the tank as can readily be seen by reference to Figures 4 and 5. The fifth wheel bolster is supported by the false bulkhead 6 and by a shear plate 31. The shear plate 31 is formed with a flange 32 which is welded to an annular rib 33 to transmit stresses to the shell proper. Gasoline or other liquid which is spilled during filling will be caught by the runway which is sunken between the tanks. The ends of the runway are provided with upstanding flanges 33 acting as dams. Between manholes and between the dams 33 and adjacent manholes we provide a plurality of drain openings 34 for the runway. The openings 34 communicate through ducts 35 with a manifold 36. A drain pipe 37 passes through bottom closure member 25 for draining spilled gasoline underneath the bottom of the tank, thus preventing it from overflowing the sides.

Each compartment of a tank is cross connected to the corresponding compartment in its mate tank by a cross connection duct 38. A drain pipe 39 is connected to each cross connection duct 38 as can readily be seen by reference to Figure 7. The upper portions of the tanks are thus interconnected at the top through side openings 21 and the tanks cross connected at the bottom.

In the modification shown in Figure 8, the cross connection duct 38 is provided with a valve 39 which isolates the compartment in tank 2 from its corresponding compartment in tank 1. This reduces hazards of the road, for if, through accident, compartment 1 is punctured, only that amount of gasoline between the bulkheads of the particular compartment will be lost. Similarly, if a compartment in tank 2 is punctured, the spillage of gasoline is reduced in half. When it is desired to drain the tank, lever 40 through operating rod 41 will open valve 39 again interconnecting the tank so that a tank vehicle may then be drained through drain connection 42.

The tank vehicle, that is the entire assembly, is supported from ground wheels 45 at the rear of the assembly. In order to increase the strength of the tank at the point of support, we provide a plate 43 provided with angles welded to longitudinal strength members 15 and 16. The plate 43 supports springs 44 which support the axle to which ground wheels 45 are secured. The forward portion of the vehicle is supported on a fifth wheel construction 46, supported by the towing vehicle as is customary in trailer vehicles.

It will be observed that we have accomplished the objects of our invention. We have provided a trailer tank construction which is of sufficient strength so that the tank itself is constituted a beam able to support the load without the use of the customary trailer frame. We have provided a trailer tank construction which is of lighter weight than any of the known tank constructions and is, nevertheless, a stronger and safer tank. Because of our construction, lighter shell metal may be employed without sacrificing safety or strength, enabling a greater pay load to be carried and a smaller dead weight load to be employed, making our tank construction more economical.

It will be understood that certain features and subcombinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, we claim.

1. In a trailer tank construction, a pair of cylindrical shells, transverse members positioned within said shells at a plurality of spaced points therealong, said transverse members being formed with fins projecting through said shells toward each other, tie plates secured to said fins, longitudinally extending members secured to said tie plates, means for supporting the forward end of said assembly, ground wheels and means for supporting the after end of said assembly from said ground wheels.

2. In a trailer tank assembly, a pair of cylindrical shells, bulkheads positioned within said shells at a plurality of places therealong dividing said shells into a plurality of respective compartments, said bulkheads being formed with fins projecting through said shells toward each other, tie plates secured to said fins above and below the axes of said shells, longitudinally extending members secured to said lower tie plates, respective pairs of compartments being formed with openings, manifolds communicating with said openings, manholes for said manifolds, means for supporting the assembly from the forward end thereof, ground wheels, and means for supporting the after end of said assembly from said ground wheels.

3. A trailer tank assembly as in claim 2, including in combination a runway extending between said shells supported upon said upper tie plates below the uppermost portions of said shells.

4. A trailer tank assembly as in claim 2, including in combination a runway extending between said shells supported upon said upper tie plates below the uppermost portions of said shells, drain openings formed in said runway, a drain manifold communicating with said openings, and a discharge pipe communicating with said drain manifold.

5. A trailer tank construction as in claim 2, including in combination a longitudinally extending tube supported by said tie plates, said tube forming a housing for a discharge hose.

6. A trailer tank construction as in claim 2, including in combination ducts providing lateral communication between corresponding compartments of respective shells and drain pipes communicating with said ducts.

7. A trailer tank construction as in claim 2, including in combination ducts providing lateral communication between corresponding compartments of respective shells, drain pipes communicating with said ducts, and respective valves for said ducts whereby a compartment of one shell may be isolated from its corresponding compartment of the other shell.

8. A trailer tank construction as in claim 2, in which the outboard sides of the respective tanks are provided with longitudinally extending members secured to said shells, said members being adapted to act as rub rails.

9. A trailer tank construction as in claim 2, including in combination a longitudinally extending member positioned between said shells and secured thereto above said lower tie plates, said member forming an inter-shell compartment with adjacent shell walls and said runway, and means forming a fluid pressure test connection communicating with said inter-shell compartment.

10. In a trailer tank construction, a pair of shells, means for securing said shells in side by side assembly relation as an integral unit, means for supporting said unit from a fifth wheel at its forward end, means for supporting the after end of said unit from ground wheels, said means for securing said shells including an upper plate and a lower plate, said plates forming a liquid tight inter-shell compartment with adjacent shell walls, and means forming a fluid pressure test connection communicating with said inter-shell compartment.

RALPH A. BRADLEY.
RALPH D. GEORGE.